United States Patent
Tanaka

(10) Patent No.: US 11,815,957 B2
(45) Date of Patent: Nov. 14, 2023

(54) CONDUCTIVE FILM AND ROLL THEREOF

(71) Applicant: ASAHI KASEI KABUSHIKI KAISHA, Tokyo (JP)

(72) Inventor: Tsuneharu Tanaka, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/783,840

(22) PCT Filed: Dec. 9, 2020

(86) PCT No.: PCT/JP2020/045889
§ 371 (c)(1),
(2) Date: Jun. 9, 2022

(87) PCT Pub. No.: WO2021/117775
PCT Pub. Date: Jun. 17, 2021

(65) Prior Publication Data
US 2023/0028970 A1 Jan. 26, 2023

(30) Foreign Application Priority Data

Dec. 10, 2019 (JP) .................................. 2019-222618

(51) Int. Cl.
*G06F 3/041* (2006.01)
*G06F 1/16* (2006.01)

(52) U.S. Cl.
CPC .. *G06F 1/1652* (2013.01); *G06F 2203/04102* (2013.01); *G06F 2203/04103* (2013.01)

(58) Field of Classification Search
CPC ................... G06F 1/1652; G06F 3/041; G06F 2203/04102; G06F 2203/04103; G06F 2203/04112
See application file for complete search history.

(56) References Cited

U.S. PATENT DOCUMENTS

| 2004/0266207 A1* | 12/2004 | Sirringhauss ........ H10K 71/621 438/725 |
| 2009/0219257 A1* | 9/2009 | Frey ......................... G06F 3/045 345/173 |
| 2010/0181571 A1* | 7/2010 | Tano ..................... H10K 10/481 257/59 |

(Continued)

FOREIGN PATENT DOCUMENTS

| JP | 2002-264239 A | 9/2002 |
| JP | 2010-192841 A | 9/2010 |

(Continued)

OTHER PUBLICATIONS

Supplementary European Search Report dated Oct. 25, 2022, in European Patent Application No. 20900273.2.

(Continued)

*Primary Examiner* — Joe H Cheng
(74) *Attorney, Agent, or Firm* — Birch, Stewart, Kolasch & Birch, LLP

(57) ABSTRACT

Provided is a conductive film comprising a substrate and a conductive part comprising at least a fine wire pattern formed on a first side of the substrate, wherein surface free energy $SFE_1$ on the first side is larger than surface free energy $SFE_2$ on a second side of the substrate opposite to the first side.

10 Claims, 7 Drawing Sheets

(56) References Cited

U.S. PATENT DOCUMENTS

| | | | |
|---|---|---|---|
| 2012/0061130 A1 | 3/2012 | Yoshi et al. | |
| 2012/0107605 A1 | 5/2012 | Ozawa et al. | |
| 2012/0312677 A1* | 12/2012 | Kuriki | G06F 3/0445 |
| | | | 200/600 |
| 2015/0173199 A1 | 6/2015 | Seong et al. | |
| 2016/0044778 A1 | 2/2016 | Irie et al. | |
| 2016/0122562 A1 | 5/2016 | Yang et al. | |
| 2016/0368104 A1 | 12/2016 | Gu et al. | |
| 2019/0235670 A1* | 8/2019 | Matsubara | G06F 3/047 |
| 2022/0113837 A1 | 4/2022 | Kamijo et al. | |

FOREIGN PATENT DOCUMENTS

| | | | | |
|---|---|---|---|---|
| JP | 2011-224956 A | 11/2011 | | |
| JP | 2015-523244 A | 8/2015 | | |
| JP | 2016-51194 A | 4/2016 | | |
| JP | 2016-108568 A | 6/2016 | | |
| JP | 2017-19273 A | 1/2017 | | |
| JP | 2017-19274 A | 1/2017 | | |
| JP | 2018081816 A | * 5/2018 | | |
| JP | 2018-202798 A | 12/2018 | | |
| KR | 10-2016-0135317 A | 11/2016 | | |
| WO | WO 2014/156489 A1 | 10/2014 | | |
| WO | WO 2015/163422 A1 | 10/2015 | | |
| WO | WO-2018159374 A1 | * 9/2018 | | A41D 1/00 |
| WO | WO 2020/027166 A1 | 2/2020 | | |

OTHER PUBLICATIONS

International Search Report (PCT/ISA/210) issued in PCT/JP2020/045889, dated Jan. 12, 2021.

Written Opinion of the International Searching Authority (PCT/ISA/237) issued in PCT/JP2020/045889, dated Jan. 12, 2021.

* cited by examiner

Figure 5
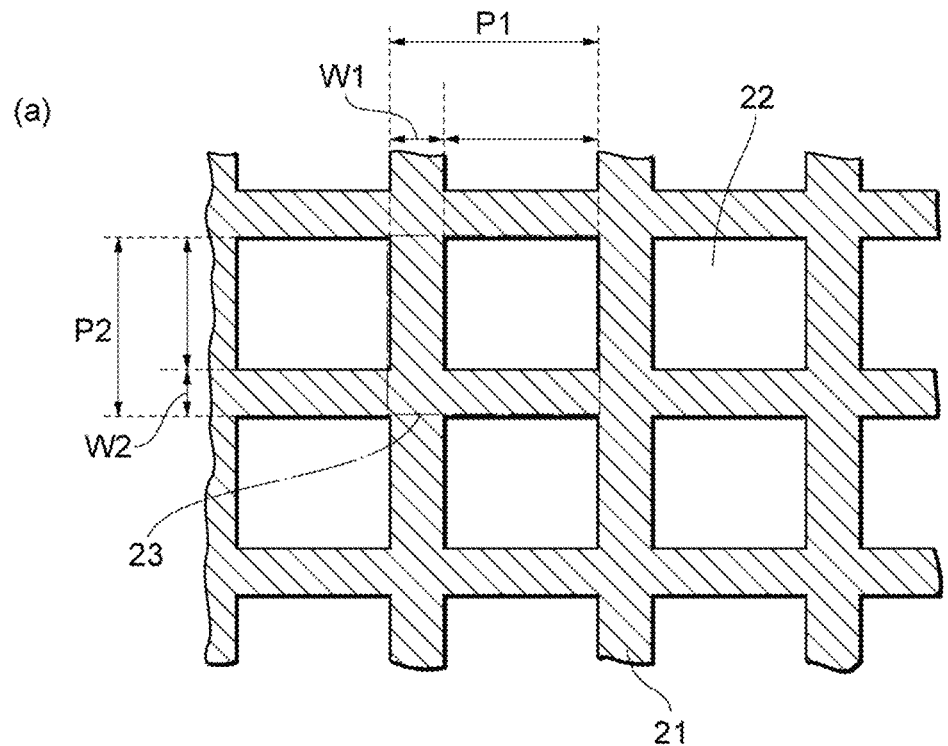
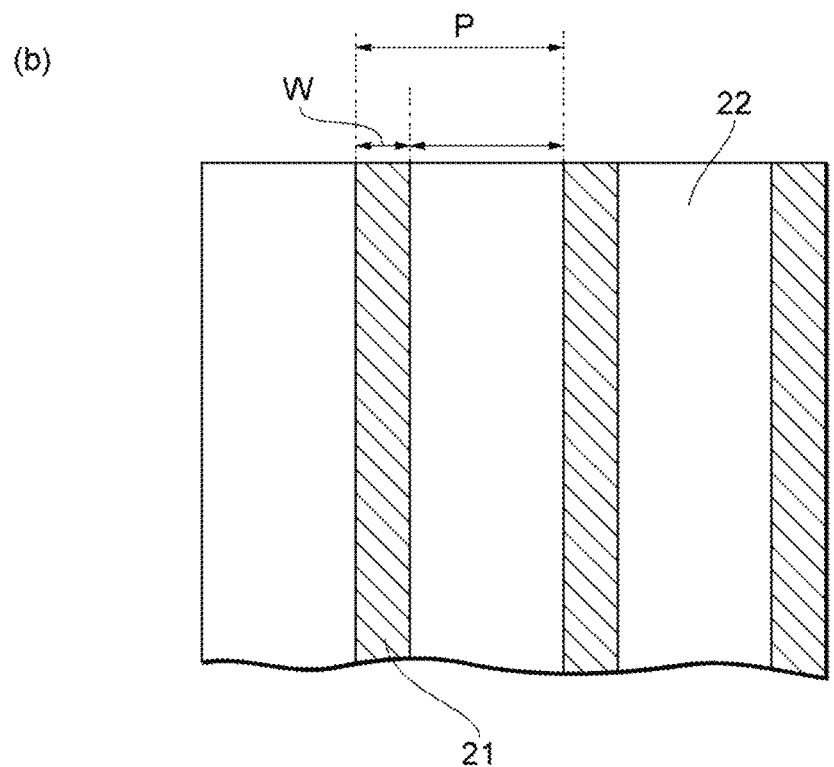

CONDUCTIVE FILM AND ROLL THEREOF

CROSS-REFERENCE TO RELATED APPLICATIONS

This application is the National Stage filed under 35 USC § 371 of PCT/JP2020/045889 filed on Dec. 9, 2020, which claims priority under 35 U.S.C. § 119 to Japanese Application No. JP 2019-222618 filed on Dec. 10, 2019, each of which are incorporated by reference.

TECHNICAL FIELD

The present invention relates to a conductive film and a roll thereof.

BACKGROUND ART

Transparent conductive films containing indium tin oxide (hereinafter, also referred to as "ITO") have heretofore been used in electronic devices such as electronic papers, touch panels, and flat-panel displays. Larger areas, improved responsiveness, and higher flexibility will be important for much higher-value added electronic devices. Hence, conductive films for use in these devices are required to improve conductivity and flexibility while maintaining their high transmittances.

Since ITO has a low electrical conductivity unique to the material, larger film thicknesses are necessary for exerting high conductivity and however, reduce transmittances. Such larger film thicknesses easily cause cracks due to deformation such as bending, deflection, or flexion. It is therefore difficult for conductive films containing ITO to exert high transmittances, conductivity, and flexibility at the same time.

Accordingly, research and development are actively underway on conductive films serving as an alternative to ITO. Conductive films having a fine metal wire patterned on a transparent substrate have received attention and have been variously studied.

For example, Patent Literature 1 discloses that the crystallite diameter of a fine metal particle sintered film measured by X-ray diffraction and the cross-sectional void ratio of the fine metal particle sintered film are defined for the purpose of improving the adhesion of the fine metal particle sintered film to a substrate and conductivity.

Patent Literature 2 discloses a method for establishing a pattern for thickness adjustment on a part where a functional pattern is not formed on a support for the purpose of preventing pressure from concentrating on the functional pattern when stacked. Patent Literature 3 discloses a reverse offset printing apparatus intended for an electronic material.

Patent Literature 4 discloses a conductive film excellent in the adhesion between a conductive layer and a hard coat layer and also excellent in conductivity, and defines the surface free energy of the hard coat layer on which the conductive layer is to be formed, in order to improve poor adhesion between the conductive layer and the hard coat layer for the purpose of preventing blocking during film winding.

CITATION LIST

Patent Literature

Patent Literature 1: Japanese Patent Laid-Open No. 2010-192841
Patent Literature 2: Japanese Patent Laid-Open No. 2016-51194
Patent Literature 3: Japanese Translation of PCT International Application Publication No. 2015-523244
Patent Literature 4: Japanese Patent Laid-Open No. 2017-019273

SUMMARY OF INVENTION

Technical Problem

A conductive film obtained as described above is wound into a roll after production and stored or distributed. It is considered that such a conductive film, even after being rewound from the roll, is variously handled in such a way that a plurality of films are stacked and stored. However, it has become evident that when a conductive part, such as a fine metal wire, formed on the surface of the conductive film is contacted with another member, for example, the back side of the conductive film, as in the roll, a portion of the conductive part formed on the surface is transferred to the back side, disadvantageously resulting in peeling, etc.

Particularly, in the case of producing a conductive film by a continuous process, as in Patent Literature 2, such a problem becomes pronounced and a set-off phenomenon occurs easily in which a conductive pattern is transferred to the back side of the film contacted with the conductive pattern in the roll of the conductive film.

In Patent Literature 4, poor adhesion between a conductive layer and a hard coat layer is improved for the purpose of preventing blocking during film winding. The conductive layer in Patent Literature 4 is a layer containing a conductive material to be formed on the hard coat layer, is a transparent conductive layer containing a resin binder, and is a uniform layer. Hence, this technique cannot be applied to a conductive layer constituted by a fine wire pattern, and a problem of the resulting film is that a portion of a fine wire pattern formed on the surface is transferred to the back side.

The present invention has been made in light of these problems. An object of the present invention is to provide a conductive film comprising a fine wire pattern which can suppress set-off and a roll of the conductive film.

Solution to Problem

The present inventors have conducted diligent studies to attain the object. As a result, the present inventors have completed the present invention by finding that the object can be attained by adjusting surface free energy on both sides of a substrate.

Specifically, the present invention is as follows.

[1]

A conductive film comprising a substrate and a conductive part comprising at least a fine wire pattern formed on a first side of the substrate, wherein
surface free energy $SFE_1$ on the first side is larger than surface free energy $SFE_2$ on a second side of the substrate opposite to the first side.

[2]

The conductive film according to [1], wherein a difference ($SFE_1 - SFE_2$) between the surface free energy $SFE_1$ and the surface free energy $SFE_2$ is 1 $mJ/m^2$ or more.

[3]

The conductive film according to [1] or [2], wherein the surface free energy $SFE_1$ is 40 to 50 $mJ/m^2$.

[4]

The conductive film according to any one of [1] to [3], wherein the substrate has a layer comprising a silicon compound as an outermost layer on the first side.

[5]

The conductive film according to any one of [1] to [4], wherein the surface free energy $SFE_2$ is 11 to 42 $mJ/m^2$.

[6]

The conductive film according to any one of [1] to [5], wherein the substrate has a layer comprising at least one member selected from the group consisting of a melamine compound, an alkyd compound, a fluorine compound, and a silicone compound as an outermost layer on the second side.

[7]

A roll of a conductive film according to any one of [1] to [6], wherein the conductive film is rolled such that the conductive part and the second side are contacted with each other.

[8]

The roll according to [7], wherein the conductive film is a long film having 10 mm or larger and 2000 mm or smaller short sides and 1.0 m or larger and 2000 m or smaller long sides, and the conductive film is rolled in the longitudinal direction.

Advantageous Effects of Invention

The present invention can provide a conductive film comprising a fine wire pattern which can suppress set-off and a roll of the conductive film.

BRIEF DESCRIPTION OF DRAWINGS

FIG. 5 shows a partial top view illustrating the relationship between the opening ratio and the pitch of the conductive film.

DESCRIPTION OF EMBODIMENTS

Hereinafter, the mode for carrying out the present invention (hereinafter, referred to as the "present embodiment") will be described in detail. However, the present invention is not limited by the present embodiment, and various changes or modifications can be made therein without departing from the spirit of the present invention.

[Conductive Film]

The conductive film of the present embodiment comprises a substrate and a conductive part comprising at least a fine wire pattern formed on a first side of the substrate, wherein surface free energy $SFE_1$ on the first side is larger than surface free energy $SFE_2$ on a second side of the substrate opposite to the first side.

Figure 1:
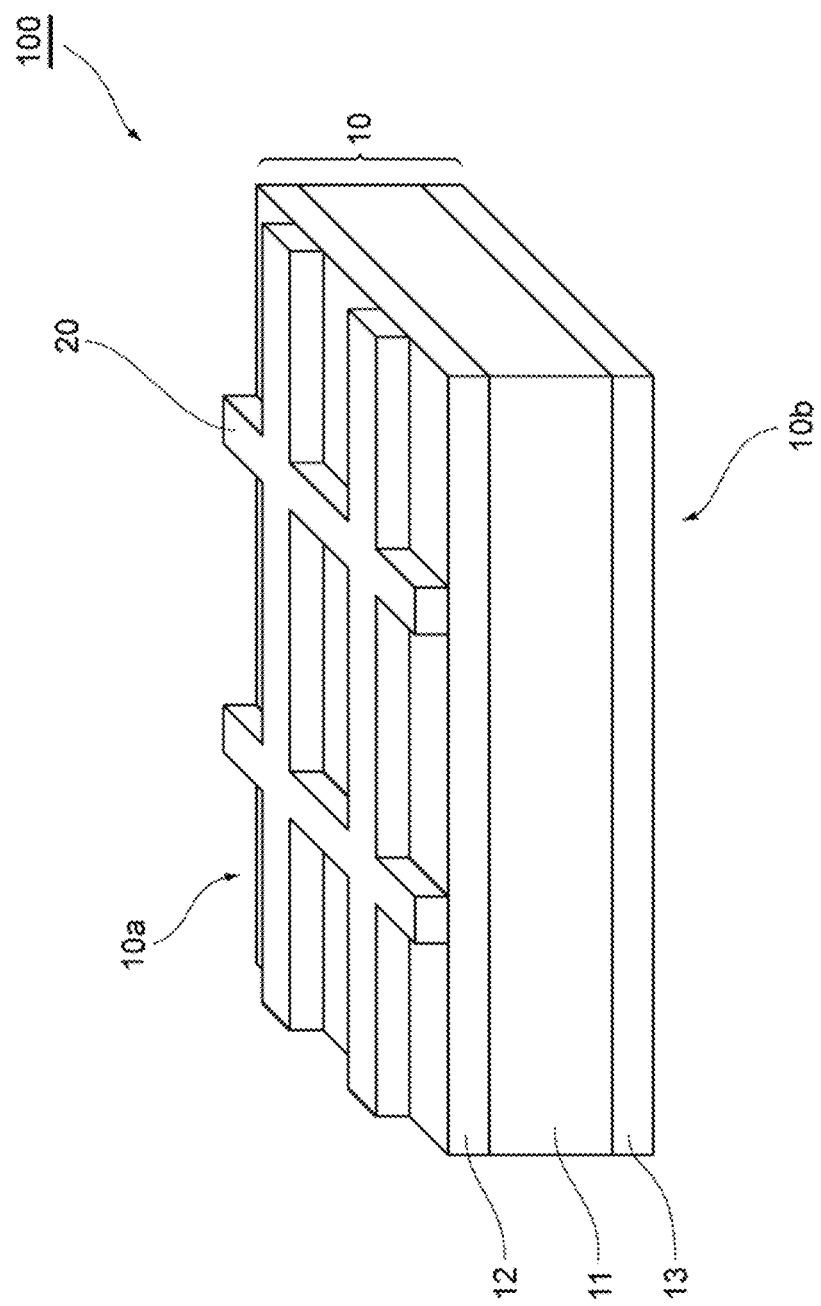
FIG. 1 shows a schematic cross-sectional view illustrating one form of the conductive film of the present embodiment.

FIG. 1 shows a schematic cross-sectional view illustrating one form of the conductive film of the present embodiment. Conductive film 100 of the present embodiment comprises substrate 10 and conductive part 20. The substrate 10 may be a single-layer film or a laminated film. FIG. 1 shows an example of the case where the substrate 10 is a laminated film. The substrate 10 shown in FIG. 1 has core layer 11, outermost layer 12 on first side 10a, and outermost layer 13 on second side 10b.

The conductive part 20 is formed on the first side 10a. As shown in FIG. 1, the conductive part 20 comprises at least a pattern constituted by a fine wire and may partially comprise a uniform metal layer.

Figure 2:
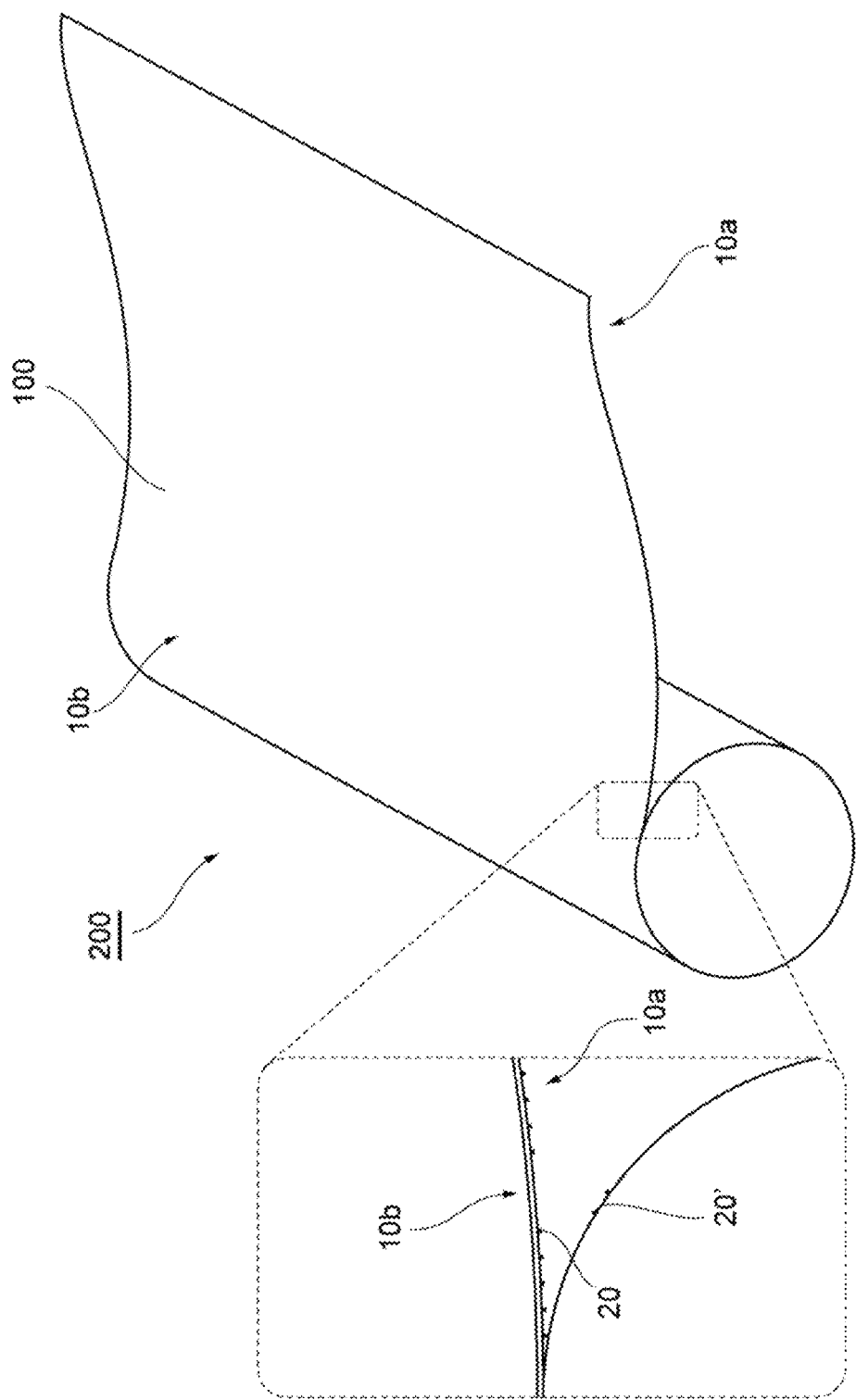
FIG. 2 shows a schematic perspective view illustrating one form of a roll of the conductive film of the present embodiment.

In order to describe set-off, FIG. 2 shows roll 200 of the conductive film 100. FIG. 2 shows a schematic view having set-off for the convenience of description. In actuality, the roll 200 of the present embodiment suppresses the set-off as shown in FIG. 2.

FIG. 2 shows roll 200 in which the conductive film 100 is rolled such that the first side 10a faces the inside and the second side 10b faces the outside. Such roll 200 may be in a form in which the conductive film 100 as long as 2000 m is wound, if necessary. Hence, a reasonable load is placed between the conductive films of the roll 200 so that the conductive part 20 is closely attached to the second side 10b. Partial transfer of the conductive part 20 to the second side 10b due to such close attachment between the conductive part 20 and the second side 10b is called set-off 20'. Such set-off 20' causes the breaking of the conductive part or the emergence of a defective product ascribable to a conductive substance adhering to an unnecessary side (second side 10b).

By contrast, the conductive film 100 of the present embodiment secures the releasability of the conductive part against the second side 10b while securing the adhesion of the conductive part to the first side 10a, by rendering surface free energy $SFE_1$ on the surface (first side 10a) of the substrate larger than surface free energy $SFE_2$ on the back side (second side 10b). As a result, even when the conductive films 100 are stacked, for example, in the process of storage or distribution or the process of use of the conductive film 100 so that the conductive part and the second side 10b are contacted with each other, the conductive part can be prevented from adhering to the second side 10b (set-off).

Particularly, the conductive part 20 in the conductive film 100 of the present embodiment comprises a fine wire pattern. The fine wire pattern compared with a conductive layer having a uniform film tends to be susceptible to set-off when the conductive films 100 are stacked so that the conductive part 20 and the second side 10b are contacted with each other. This is because the set-off is a phenomenon in which a layer of the conductive part 20 is destroyed due to the conductive part adhering to the second side 10b; and the suppression thereof requires the strength of the conductive part layer itself in addition to adhesive force to the first side 10a. Hence, when the conductive layer is a solid film, set-off is suppressed by the strength of the whole film. On the other hand, in the case of the fine metal wire pattern shown in FIG. 1, the mechanism of suppression of set-off by the film strength described above does not work in the conductive part 20 due to the thinness of the fine wire.

For the reason described above, the prevention of set-off in the conductive film comprising a fine wire pattern requires securing not only the adhesive force between the conductive part 20 and the first side 10a but releasability by controlling the adhesive force between the conductive part 20 and the second side 10b.

From these viewpoints, the difference (SFE$_1$–SFE$_2$) between the surface free energies SFE is preferably 1 mJ/m$^2$ or more, more preferably 5 mJ/m$^2$ or more, further preferably 10 mJ/m$^2$ or more, particularly preferably 16 mJ/m$^2$ or more, most preferably 20 mJ/m$^2$ or more. The difference (SFE$_1$–SFE$_2$) is 1 mJ/m$^2$ or more, whereby set-off is further suppressed so that the yield of the conductive film tends to be further improved. The upper limit of the difference (SFE$_1$–SFE$_2$) between the surface free energies SFE is not particularly limited and is preferably 100 mJ/m$^2$ or less, more preferably 40 mJ/m$^2$ or less. This can prevent adhesion on the first side 10a from being improved too much to cause rather contamination by dust, etc.

From a similar viewpoint, the surface free energy SFE$_1$ is preferably 20 to 100 mJ/m$^2$, more preferably 20 to 75 mJ/m$^2$, further preferably 20 to 50 mJ/m$^2$. The surface free energy SFE$_1$ is 40 mJ/m$^2$ or larger, whereby the adhesion of the conductive part 20 to the first side 10a tends to be further improved. The surface free energy SFE$_1$ is 100 mJ/m$^2$ or smaller, whereby contamination by dust, etc. tends to be further suppressed. The surface free energy SFE$_1$ can be adjusted by the material of the outermost layer 12 when the substrate 10 has the outermost layer 12, and by the material of the core layer 11 when the substrate 10 has no outermost layer 12. The surface free energy SFE$_1$ can also be adjusted by surface roughness on the first side 10a.

The surface roughness (arithmetic average roughness Ra$_1$) on the first side 10a is preferably 0.1 nm or more and 20 nm or less because the range of the surface free energy SFE$_1$ described above can be maintained, and is preferably 0.2 nm or more and 10 nm or less because a defect in the fine wire pattern formed on the first side 10a can be suppressed. 0.3 nm or more and 5 nm or less are further preferred.

From a similar viewpoint, the surface free energy SFE$_2$ is preferably 5 to 42 mJ/m$^2$, more preferably 11 to 42 mJ/m$^2$, further preferably 11 to 30 mJ/m$^2$, particularly preferably 11 to 25 mJ/m$^2$. The surface free energy SFE$_2$ is 5 mJ/m$^2$ or larger, whereby processability tends to be improved when additional treatment is performed, such as the coating of the second side 10b with another layer or the lamination of the second side 10b to the surface of another member. Lower surface free energy SFE$_2$ tends to decreases a friction coefficient on the second side 10b. By contrast, the surface free energy SFE$_2$ is 5 mJ/m$^2$ or larger, whereby the slippage between a conveyance unit and the second side 10b can be suppressed when the conductive film 100 or the substrate 10 is conveyed with the conveyance unit (e.g., a roller) at the time of production. Furthermore, the conveyance unit tends to facilitate the tension control of the conductive film 100 or the substrate 10. Such tension control is required, particularly, for a printing method of conveying the substrate 10 while forming fine metal wire 21 on its surface using ink. The surface free energy SFE$_2$ is 42 mJ/m$^2$ or smaller, whereby set-off is further suppressed so that the yield of the conductive film tends to be further improved. The surface free energy SFE$_2$ can be adjusted by the material of the outermost layer 13 when the substrate 10 has the outermost layer 13, and by the material of the core layer 11 when the substrate 10 has no outermost layer 13. The surface free energy SFE$_2$ can also be adjusted by surface roughness on the second side 10b.

The surface roughness (arithmetic average roughness Ra$_2$) on the second side 10b is preferably 0.1 nm or more and 20 nm or less because the range of the surface free energy SFE$_2$ described above can be maintained, and is preferably 0.2 nm or more and 10 nm or less because a defect can be suppressed in overlaying the fine wire pattern formed on the first side 10a onto the second side 10b when the conductive film 100 is rolled. 0.3 nm or more and 5 nm or less are further preferred.

As for the surface roughness of the first side 10a and the second side 10b, their respective arithmetic average roughness Ra$_1$ and Ra$_2$ preferably satisfy the expression (5) given below. The expression (5) thus satisfied is preferred because a defect can be suppressed in overlaying the fine wire pattern formed on the first side 10a onto the second side 10b when the conductive film 100 is rolled.

$$Ra_1 \geq Ra_2 \tag{5}$$

A detailed mechanism under which a defect at the time of rolling can be suppressed according to the expression (5) thus satisfied is unknown, but is presumably as follows: when the conductive film 100 is rolled, wound roll stress occurs due to rolling tension so that the first side 10a and the second side 10b of the overlaid films are slightly displaced and rubbed. At this time, irregularities on the second side 10b causes a defect in the fine wire pattern formed on the first side 10a.

Smaller difference between the surface roughness on the first side 10a and the surface roughness on the second side 10b is preferred. Absolute value |Ra$_1$–Ra$_2$| of the difference between their respective values of arithmetic average roughness Ra is preferably 3 nm or less, and is preferably 2 nm or less because a defect suppressive effect becomes pronounced. 1 nm or less is further preferred.

Subsequently, the surface free energy defined in the present embodiment will be described. In general, molecules present inside a resin are present in a state stabilized through interaction with their surrounding molecules, whereas molecules present in the resin surface receive a less stabilizing effect by their surrounding molecules because the molecules form the surface. Hence, the molecules present in the surface have larger free energy than that of the molecules present in the inside. This energy is called surface free energy.

According to the theoretical expression of Kaelbel and Uy, surface free energy γ possessed by substance surface can be represented by the expression (1) given below on the basis of a dispersive component ($\gamma^d$) and a polar component ($\gamma^p$). Surface free energy $\gamma_{SV}$ of a solid and surface free energy $\gamma_{LV}$ of a liquid can be represented by the expressions (2) and (3), respectively, given below. In this context, it is known that when a contact angle obtained by adding dropwise a certain solvent onto the surface of the substrate which is a solid is defined as θ, the relationship of the following expression (4) holds.

$$\gamma = \gamma^d + \gamma^p \tag{1}$$

$$\gamma_{SV} = \gamma_{SV}^d + \gamma_{SV}^p \tag{2}$$

$$\gamma_{LV} = \gamma_{LV}^d + \gamma_{LV}^p \tag{3}$$

$$\gamma_L(1+\cos\theta)/2 = (\gamma_{SV}^d \times \gamma_{LV}^d)^{0.5} + (\gamma_{SV}^p \times \gamma_{LV}^p)^{0.5} \tag{4}$$

In order to determine unknown two components as to the surface free energy of a solid, the contact angle θ between the solvent and the first side 10a or the second side 10b is measured using two types of liquids having known surface free energy. Then, the simultaneous equation can be solved by the substitution of the obtained values into the expression (4) to determine a dispersive component ($\gamma_{SV}^d$) and a polar component ($\gamma_{SV}^p$) of the surface free energy on the first side 10a or the second side 10b. The surface free energy $\gamma_{SV}$ of the solid can be determined according to the expression (2).

[Substrate]

The substrate used in the present embodiment is not particularly limited, and, for example, a transparent substrate or an opaque substrate can be used. In this context, the term "transparent" means that the visible light transmittance is preferably 80% or more, more preferably 90% or more, further preferably 95% or more. In this context, the visible light transmittance can be measured in accordance with JIS K 7361-1: 1997. The opaque substrate refers to a substrate having a visible light transmittance of less than 80%. The opaque substrate includes a substrate completely shielded against visible light as well as a semitransparent substrate that permits partial penetration of visible light. Among them, a transparent substrate is preferred as the substrate.

The substrate may be made of one material or may be made of two or more materials laminated with each other. When the substrate is a laminate in which two or more materials are laminated with each other, the substrate may be made of organic substrates or inorganic substrates laminated with each other or may be made of an organic substrate(s) and an inorganic substrate(s) laminated with each other.

FIG. 1 illustrates substrate 10 consisting of core layer 11, outermost layer 12 constituting first side 10a, and outermost layer 13 constituting second side 10b, though the configuration of the substrate 10 is not limited thereto. Examples of the form of the substrate 10 include a single-layer film of the core layer 11, a laminated film having the core layer 11 and the outermost layer 12, a laminated film having the core layer 11 and the outermost layer 13, a laminated film having the outermost layer 12 and the outermost layer 13, and a laminated film having the core layer 11, the outermost layer 12, and the outermost layer 13. These laminated films may further have an additional layer between the core layer 11 and the outermost layer 12, between the core layer 11 and the outermost layer 13, or between the outermost layer 12 and the outermost layer 13. In the laminated film having the core layer 11 and the outermost layer 12, the surface of the core layer 11 constitutes the first side 10a. In the laminated film having the core layer 11 and the outermost layer 13, the surface of the core layer 11 constitutes the second side 10b. Hereinafter, the configuration of each layer will be described in detail.

(Core Layer 11)

The material constituting the core layer 11 is not particularly limited and is preferably a material that contributes to improvement in the mechanical strength of the substrate.

Examples of such a material of the core layer 11 include, but are not particularly limited to: transparent inorganic substrates such as glass; and transparent organic substrates such as acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic polyamide, polyether ether ketone, polysulfone, polyethersulfone, polyimide, and polyetherimide. Among them, use of polyethylene terephthalate attains better productivity (cost reduction effect) for producing the conductive film. Use of polyimide attains better heat resistance of the conductive film. Use of polyethylene terephthalate and/or polyethylene naphthalate attains better adhesion of the transparent substrate to the fine metal wire.

The core layer 11 may be made of one material or may be made of two or more materials laminated with each other. When the core layer 11 is a laminate in which two or more materials are laminated with each other, the substrate may be made of organic substrates or inorganic substrates laminated with each other or may be made of an organic substrate(s) and an inorganic substrate(s) laminated with each other.

The thickness of the core layer 11 is preferably 5 or larger and 500 µm or smaller, more preferably 10 or larger and 100 µm or smaller.

(Outermost Layer 12)

When the substrate 10 is a laminate, the outermost layer 12 is a layer constituting the first side 10a. The material constituting the outermost layer 12 on the first side is not particularly limited and is preferably a material that contributes to improvement in the adhesion between the core layer 11 and the conductive part 20. When the substrate 10 is in a form having the outermost layer 12 and the outermost layer 13 and having no core layer 11, the outermost layer 12 preferably contributes to improvement in the adhesion between the outermost layer 13 and the conductive part 20. When the substrate 10 has the outermost layer 12, the surface free energy $SFE_1$ is the surface free energy of the outermost layer 12.

Examples of the component contained in such an outermost layer 12 include, but are not particularly limited to: silicon compounds such as (poly)silanes, (poly)silazanes, (poly)silthianes, (poly)siloxanes, silicon, silicon carbide, silicon oxide, silicon nitride, silicon chloride, silicate, zeolite, and silicide; aluminum compounds such as aluminum oxide; and magnesium compounds such as magnesium fluoride.

Among them, a silicon compound is preferred, and a siloxane is more preferred. Use of such a component improves surface free energy on the first side 10a and improves the adhesion. In addition, the transparency and durability of the conductive film tend to be further improved.

Examples of the silicon compound include, but are not particularly limited to, condensates of polyfunctional organosilane, and polycondensates obtained by the hydrolysis reaction of polyfunctional organosilane or its oligomer with polyvinyl acetate.

Examples of the polyfunctional organosilane include, but are not particularly limited to: bifunctional organosilane such as dimethyldimethoxysilane, dimethyldiethoxysilane, diethyldimethoxysilane, diethyldiethoxysilane, diphenyldimethoxysilane, and diphenyldiethoxysilane; trifunctional organosilane such as methyltrimethoxysilane, methyltriethoxysilane, and phenyltrimethoxysilane; and tetrafunctional organosilane such as tetramethoxysilane and tetraethoxysilane.

The outermost layer 12 can be prepared by a film formation method of applying a composition containing the component for the outermost layer 12 to the core layer 11, followed by drying. The outermost layer 12 may be prepared by a vapor deposition method such as PVD or CVD. The composition for forming the outermost layer 12 may contain, if necessary, a dispersant, a surfactant, a binder, or the like.

The thickness of the outermost layer 12 is preferably 0.01 µm or larger and 100 µm or smaller, more preferably 0.01 µm or larger and 10 µm or smaller, further preferably 0.01 µm or larger and 1 µm or smaller. The thickness of the outermost layer 12 falls within the range described above, whereby the adhesion is further improved. In addition, the transparency and durability of the conductive film tend to be further improved.

The outermost layer 12 laminated on the core layer 11 can prevent plasma or the like from etching the core layer 11 at a site uncovered with the conductive part 20, for example, when the conductive part 20 is formed by sintering a metal component in ink by a calcination approach such as plasma.

This outermost layer 12 preferably further has an antistatic function in order to prevent the breaking of the fine metal wire pattern (conductive part 20) ascribable to static electricity. For the outermost layer 12 having an antistatic function, it is preferred that the outermost layer 12 should comprise at least any of a conductive inorganic oxide and a conductive organic compound.

Examples of the conductive organic compound include conductive organosilane compounds, aliphatic conjugated polyacetylene, aromatic conjugated poly(p-phenylene), and heterocyclic conjugated polypyrrole. Among them, a conductive organosilane compound is preferred.

For the antistatic function, the volume resistivity of the outermost layer 12 is preferably 100 Ωcm or more and 100000 Ωcm or less, more preferably 1000 Ωcm or more and 10000 Ωcm or less, still more preferably 2000 Ωcm or more and 8000 Ωcm or less. The volume resistivity of the outermost layer 12 is 100000 Ωcm or less, whereby an antistatic function is exerted. The volume resistivity of the outermost layer 12 is 100 Ωcm or more, whereby the resulting conductive film can be suitably used for purposes such as touch panels for which electrical conduction between fine metal wire patterns is undesirable. The volume resistivity can be adjusted by the content of the component, such as the conductive inorganic oxide or the conductive organic compound, which exerts an antistatic function, in the outermost layer. When the outermost layer 12 comprises, for example, highly plasma-resistant silicon oxide (volume specific resistance: $10^{14}$ Ω·cm or more) and an organosilane compound as the conductive organic compound, the volume resistivity can be reduced by increasing the content of the conductive organosilane compound. On the other hand, the volume resistivity is increased by increasing the content of the silicon oxide. Because of the high plasma resistance, a thin film can be formed without impairing optical characteristics.

The outermost layer 12 described above can be prepared by a vapor deposition such as PVD or CVD, or a film formation method of applying and drying an outermost layer-forming composition containing the component for the outermost layer 12 dispersed in a dispersion medium. The outermost layer-forming composition may contain, if necessary, a dispersant, a surfactant, a binder, or the like.

(Outermost Layer 13)

When the substrate 10 is a laminate, the outermost layer 13 is a layer constituting the second side 10b. The material constituting the outermost layer 13 on the second side is not particularly limited and is preferably a material that contributes to reduction in adhesion to the conductive part 20. When the substrate 10 has the outermost layer 13, the surface free energy $SFE_2$ is the surface free energy of the outermost layer 13.

Examples of the component contained in such outermost layer 13 include, but are not particularly limited to, melamine compounds, alkyd compounds, fluorine compounds, silicone compounds, polyethylene wax, fatty acids, and fatty acid esters. Among them, at least one member selected from the group consisting of a melamine compound, an alkyd compound, a fluorine compound, and a silicone compound is preferred, and a melamine compound or an alkyd compound is more preferred. Use of such a component reduces surface free energy on the second side 10b and improves releasability against the conductive part. In addition, the transparency and durability of the conductive film tend to be further improved.

Examples of the melamine compound include, but are not particularly limited to, melamine, methylolized melamine derivatives obtained by condensing melamine with formaldehyde, and partially or completely etherified compounds of methylolized melamine derivative through reaction with a lower alcohol.

Examples of the methylolized melamine derivative include, but are not particularly limited to, monomethylol melamine, dimethylol melamine, trimethylol melamine, tetramethylol melamine, pentamethylol melamine, hexamethylol melamine, and hexamethoxy methylol melamine.

Examples of the lower alcohol constituting the melamine compound include, but are not particularly limited to, methyl alcohol, ethyl alcohol, isopropyl alcohol, n-butanol, and isobutanol.

Examples of the alkyd compound include ester polymers of a polybasic acid, a fatty acid, and a polyhydric alcohol.

Examples of the polybasic acid constituting the alkyd compound include, but are not particularly limited to, phthalic anhydride, isophthalic acid, terephthalic acid, benzoic acid, rosin, tetrahydrophthalic anhydride, maleic anhydride, adipic acid, and succinic acid.

Examples of the fatty acid constituting the alkyd compound include, but are not particularly limited to: saturated fatty acids such as caproic acid, caprylic acid, undecylic acid, lauric acid, tridecylic acid, myristic acid, palmitic acid, stearic acid, behenic acid, lignoceric acid, cerotic acid, montanic acid, and melissic acid; unsaturated fatty acids such as oleic acid, elaidic acid, linoleic acid, linolenic acid, arachidonic acid, brassidic acid, erucic acid, and ricinoleic acid; and linseed oil, soybean oil, and castor oil.

Examples of the polyhydric alcohol constituting the alkyd compound include, but are not particularly limited to, glycerin, pentaerythritol, ethylene glycol, propylene glycol, neopentyl glycol, and trimethylolpropane.

Examples of the fluorine compound include, but are not particularly limited to, compounds containing a polyfluoroalkyl group or a polyfluoroalkyl ether group having 3 to 40, particularly, 5 to 20 carbon atoms.

Examples of the silicone compound include, but are not particularly limited to, silicone oil consisting of polydimethylsiloxane, phenyl-modified silicone oil in which the methyl groups of polydimethylsiloxane are partially replaced with phenyl groups, alkyl-modified silicone oil in which the methyl groups of polydimethylsiloxane are partially replaced with hydrogen or alkyl groups having 2 or more carbon atoms, halogen-modified silicone oil in which the methyl groups of polydimethylsiloxane are partially replaced with phenyl halide groups, fluorine-modified silicone oil in which the methyl groups of polydimethylsiloxane are partially replaced with fluoroester groups, epoxy-modified silicone oil such as polydimethylsiloxane having epoxy groups, amino-modified silicone oil such as polydimethylsiloxane having amino groups, alkylaralkylsilicone oil such as dimethylsiloxane and phenylmethylsiloxane, and polyether-modified silicone oil such as polydimethylsiloxane having a structure where the methyl groups of a dimethylsiloxane unit are partially replaced with polyether.

Examples of the fatty acid include saturated or unsaturated fatty acids having 12 or more carbon atoms. Examples of the fatty acid include lauric acid, tridecylic acid, myristic acid, pentadecylic acid, palmitic acid, heptadecylic acid, stearic acid, nonadecanoic acid, behenic acid, lignoceric acid, cerotic acid, heptacosanoic acid, montanic acid, melissic acid, lacceroic acid, oleic acid, elaidic acid, linoleic acid, linolenic acid, arachidonic acid, cetoleic acid, and erucic acid. The fatty acid is preferably a saturated fatty acid having 12 to 22 carbon atoms.

Examples of the fatty acid ester include, but are not particularly limited to, fatty acid esters of the fatty acid and an alcohol having 2 to 30 carbon atoms. Examples of the alcohol constituting the fatty acid ester include, but are not particularly limited to, monohydric alcohols such as propyl alcohol, isopropyl alcohol, butyl alcohol, octyl alcohol, capryl alcohol, lauryl alcohol, myristyl alcohol, stearyl alcohol, and behenyl alcohol, and polyhydric alcohols such as ethylene glycol, propylene glycol, butanediol, glycerin, pentaerythritol, and sorbitan.

Examples of the polyethylene wax include, but are not particularly limited to, low-molecular-weight polyethylene, low-molecular-weight polyethylene copolymers, and modified polyethylene wax harboring a polar group by the oxidative modification or acidic modification thereof.

The thickness of the outermost layer 13 is preferably 0.01 μm or larger and 100 μm or smaller, more preferably 0.01 μm or larger and 10 μm or smaller, further preferably 0.01 μm or larger and 1 μm or smaller. The thickness of the outermost layer 13 falls within the range described above, whereby releasability against the conductive part 20 is improved. In addition, the transparency and durability of the conductive film 100 tend to be further improved.

(Other Layers)

Examples of the additional layer disposed between the core layer 11 and the outermost layer 12, between the core layer 11 and the outermost layer 13, or between the outermost layer 12 and the outermost layer 13 include, but are not particularly limited to, easily adhesive layers.

The easily adhesive layer is used for the purpose of improving the adhesion between the core layer 11 and the outermost layer 12, between the core layer 11 and the outermost layer 13, or between the outermost layer 12 and the outermost layer 13. The easily adhesive layer for use between the core layer 11 and the outermost layer 13 may be used for improving the surface roughness of the outermost layer 13. Specifically, the surface roughness of the outermost layer 13 may be improved by enhancing the surface roughness of the easily adhesive layer serving as a base. This tends to further improve releasability against the conductive part 20.

[Conductive Part 20]

The conductive part 20 is disposed on the first side 10a of the substrate 10. FIG. 1 shows the conductive part 20 as a fine metal wire pattern constituted by a fine metal wire, though the conductive part 20 is not limited thereto. The conductive part 20 comprises at least a fine wire pattern and may partially have a solid metal pattern. The fine metal wire pattern may be a regular pattern or an irregular pattern.

The conductive part 20 comprises a conductive component. Examples of the conductive component include, but are not particularly limited to, conductive metals and conductive polymers. The conductive part 20 may comprise a non-conductive component. Examples of the conductive metal include, but are not particularly limited to, gold, silver, copper, and aluminum. Among them, silver or copper is preferred, and relatively inexpensive copper is more preferred. Use of such a conductive metal tends to attain better conductivity of the conductive film. A conductive polymer known in the art can be used. Examples thereof include polyacetylene and polythiophene.

Examples of the non-conductive component include, but are not particularly limited to, metal oxides, metal compounds, and organic compounds. More specifically, examples of these non-conductive components include metal oxides, metal compounds, and organic compounds that are components derived from components contained in ink mentioned later and remain in the fine metal wire after calcination among the components contained in ink.

The content ratio of the conductive component in the conductive part 20 is preferably 50% by mass or more, more preferably 60% by mass or more, further preferably 70% by mass or more. The upper limit of the content ratio of the conductive component is not particularly limited and is 100% by mass. The content ratio of the non-conductive component is preferably 50% by mass or less, more preferably 40% by mass or less, further preferably 30% by mass or less. The lower limit of the content ratio of the non-conductive component is not particularly limited and is 0% by mass.

Figure 3:
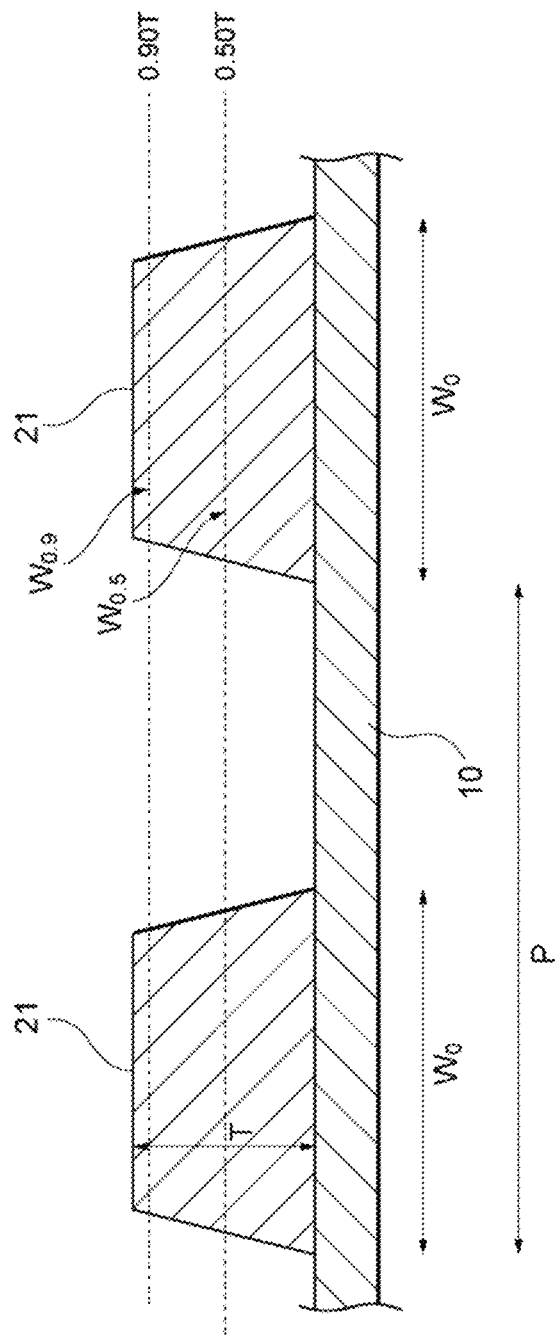
FIG. 3 shows a top view illustrating one form of the conductive film of the present embodiment.
Figure 4:
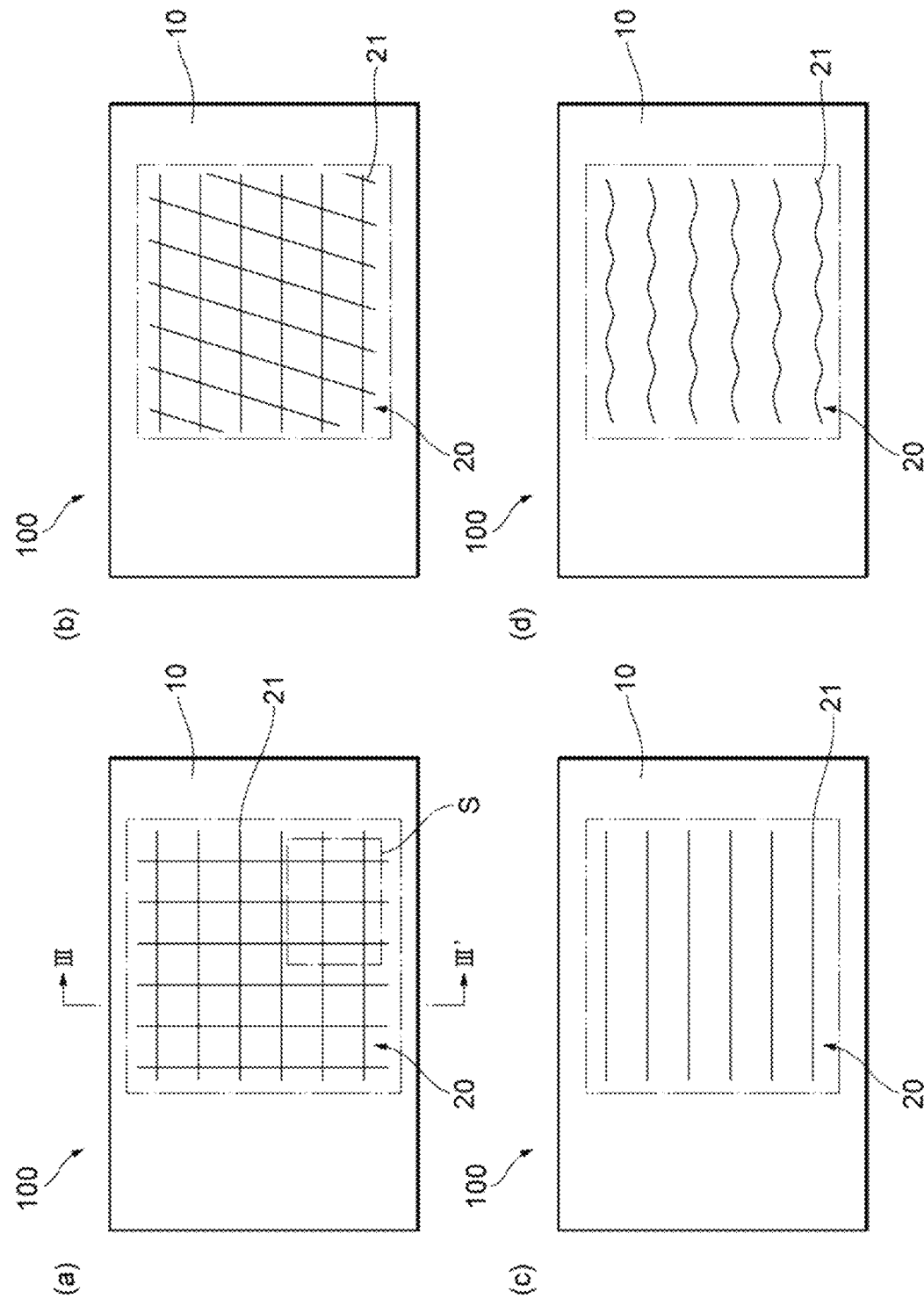
FIG. 4 shows a partial cross-sectional view taken along the I-I' line in the conductive film of FIG. 3.

The fine metal wire pattern of the conductive part 20 can be designed according to the purpose of an intended electronic device. Examples thereof include, but are not particularly limited to, a mesh pattern (FIGS. 4(a) and 4(b)) formed by a plurality of lines of the fine metal wire intersecting in a net-like form, and a line pattern (FIGS. 4(c) and 4(d)) formed by a plurality of substantially parallel lines of the fine metal wire. Alternatively, the fine metal wire pattern may be a combination of the mesh pattern and the line pattern. The mesh of the mesh pattern may have a square or rectangular shape as shown in FIG. 4(a) or may have a polygonal shape such as a rhombus as shown in FIG. 4(b). The fine metal wire constituting the line pattern may be a straight line as shown in FIG. 4(c) or may be a curved line as shown in FIG. 4(d). The fine metal wire constituting the mesh pattern can also be a curved line. Line width W of the fine metal wire 21 refers to line width $W_0$ of the fine metal wire 21 when the fine metal wire 21 is projected onto the surface of the substrate 10 from the side where the conductive part 20 is disposed, of the substrate 10. FIG. 3 shows a partial cross-sectional view taken along the line in the conductive film of FIG. 4. Referring to this FIG. 4, the line width $W_0$ of fine metal wire 21 having a trapezoidal cross-section is the width on the side contacted with the substrate 10, of the fine metal wire 21.

The line width $W_0$ of the fine metal wire 21 is preferably 0.1 to 30.0 μm, more preferably 0.2 to 20.0 μm, further preferably 0.3 to 10.0 μm, particularly preferably 1.0 to 5.0 μm. The line width $W_0$ of the fine metal wire 21 is 0.1 μm or larger, whereby the conductivity of the conductive part 20 tends to be further improved. Furthermore, reduction in conductivity ascribable to the oxidation, corrosion, or the like of the surface of the fine metal wire 21 can be sufficiently suppressed. A thinner line width of the fine metal wire 21 permits increase in the number of lines of the fine metal wire 21 at the same opening ratio. This attains more uniform electrical field distribution of the conductive film 100 and enables a higher-resolution electronic device to be prepared. If some lines of the fine metal wire 21 are broken, this influence can be compensated for by the other lines of the fine metal wire 21. On the other hand, the line width $W_0$ of the fine metal wire 21 is 30.0 μm or smaller, whereby the visibility of the fine metal wire 21 is further reduced. Thus, the transparency of the conductive film 100 tends to be further improved.

The thickness T of the fine metal wire 21 is preferably 10 to 1000 nm, more preferably 50 to 700 nm, further preferably 75 to 500 nm. The thickness T of the fine metal wire 21 is 10 nm or larger, whereby conductivity tends to be further improved. Reduction in conductivity ascribable to the oxidation, corrosion, or the like of the surface of the fine metal wire 21 tends to be able to be sufficiently suppressed. On the other hand, the thickness T of the fine metal wire 21 is 1,000 nm or smaller, whereby high transparency tends to be exerted in a wide view angle.

The cross-sectional shape of the fine metal wire 21 can be defined by the line width W and the thickness T of the fine metal wire. Heights from the interface between the substrate 10 and the fine metal wire 21 are defined as 0.50T and 0.90T based on the thickness T of the fine metal wire 21. The width of the fine metal wire 21 at the height of 0.50T is defined as $W_{0.50}$, and the width of the fine metal wire 21 at the height of 0.90T is defined as $W_{0.90}$. In this respect, $W_{0.50}/W_0$ is preferably 0.70 to 0.99, more preferably 0.75 to 0.99 or less, further preferably 0.80 to 0.95. $W_{0.90}/W_{0.50}$ is preferably 0.50 to 0.95, more preferably 0.55 to 0.90, further preferably 0.60 to 0.85. In the conductive film of the present embodiment, $W_{0.50}/W_0$ is preferably larger than $W_{0.90}/W_{0.50}$. Specifically, it is preferred that the width of the fine metal wire 21 should decrease gradually from a height position at a thickness of 0.50T toward a height position at a thickness of 0.90T from the interface of the fine metal wire 21 on the substrate 10 side.

As mentioned later, the conductive film of the present embodiment can be formed by a printing method using ink. The fine metal wire 21 formed by the method has the characteristic shape as described above. Other possible methods for forming the fine metal wire are a method using a nanoimprint method or a lithography method, other methods using nanowire, and the like. However, fine metal wires prepared by these methods differ in the shape from the fine metal wire formed by the printing method.

(Aspect Ratio)

The aspect ratio represented by the thickness T of the fine metal wire 21 to the line width $W_0$ of the fine metal wire 21 is preferably 0.05 or more and 1.00 or less. The lower limit of the aspect ratio is more preferably 0.08 or more, further preferably 0.10 or more. A higher aspect ratio tends to be able to further improve conductivity without reducing transmittances.

(Pitch)

The pitch P of the fine metal wire pattern is preferably 0.2 to 1000 μm, more preferably 10 to 750 μm, further preferably 50 to 500 μm. The pitch P of the fine metal wire pattern is 0.2 μm or larger, whereby a favorable transmittance can be obtained. The pitch P of the fine metal wire pattern is 1,000 μm or smaller, whereby conductivity tends to be able to be further improved. When the shape of the fine metal wire pattern is a mesh pattern, an opening ratio of 99% can be attained by setting the pitch of a fine metal wire pattern having a line width of 1 μm to 200 μm. The pitch P means the sum of the line width $W_0$ and the distance between lines of the fine metal wire.

The line width, aspect ratio, and pitch of the fine metal wire pattern can be confirmed by observing the conductive film cross-section under an electron microscope or the like. The line width and pitch of the fine metal wire pattern can also be observed under a laser microscope or an optical microscope. Since the pitch and the opening ratio have a relational expression mentioned later, one of these factors can be calculated if the other factor is known. Examples of the method for adjusting the line width, aspect ratio, and pitch of the fine metal wire pattern to the desired ranges include a method of adjusting grooves of a plate for use in a method for producing the conductive film mentioned later, and a method of adjusting the average particle size of metal particles in ink.

(Opening Ratio)

The opening ratio of the fine metal wire pattern is preferably 60% or more, more preferably 70% or more, further preferably 80% or more, particularly preferably 90% or more. The opening ratio of the fine metal wire pattern is equal to or more than the specific value mentioned above, whereby the transmittance of the conductive film tends to be further improved. The opening ratio of the fine metal wire pattern is preferably less than 100%, more preferably 95% or less, further preferably 90% or less, still further preferably 80% or less, even further preferably 70% or less, particularly preferably 60% or less. The opening ratio of the fine metal wire pattern is equal to or less than the specific value mentioned above, whereby the conductivity of the conductive film tends to be further improved. The opening ratio of the fine metal wire pattern also differs in appropriate value depending on the shape of the fine metal wire pattern. The upper limit value and lower limit value of the opening ratio of the fine metal wire pattern can be appropriately combined according to the required performance (transmittance and sheet resistance) of an intended electronic device.

The "opening ratio of the fine metal wire pattern" can be calculated according to an expression given below as to a region where the fine metal wire pattern is formed on the transparent substrate. The region where the fine metal wire pattern is formed on the transparent substrate is a range represented by S in FIG. 3 and excludes a marginal part and the like where the fine metal wire pattern is not formed.

Opening ratio of the fine metal wire pattern=(1−Area occupied by the fine metal wire pattern/Area of the transparent substrate)×100

The relational expression of the opening ratio and the pitch differs depending on the shape of the fine metal wire pattern. Their relationship can be calculated as given below. FIG. 5(a) shows a schematic view of a mesh pattern (grid pattern) having pattern unit 23. In the case of this mesh pattern, the opening ratio and the pitch have the following relational expression:

Opening ratio={Area of opening part 22/Area of pattern unit 23}×100

={((Pitch P1−Line width W1)×(Pitch P2−Line width W2))/(Pitch P1×Pitch P2)}×100

FIG. 5(b) shows a schematic view of a line pattern. In the case of this line pattern, the opening ratio and the pitch have the following relational expression:

Opening ratio={(Pitch P−Line width W)/Pitch P}×100

(Sheet Resistance)

The sheet resistance of the conductive film 100 is preferably 0.1 Ω/sq or more and 1,000 Ω/sq or less, more preferably 0.1 Ω/sq or more and 500 Ω/sq or less, further preferably 0.1 Ω/sq or more and 100 Ω/sq or less, still further preferably 0.1 Ω/sq or more and 20 Ω/sq or less, even further preferably 0.1 Ω/sq or more and 10 Ω/sq or less. The sheet resistance of the conductive film can be measured by a method given below.

First, a rectangular portion throughout which the fine metal wire pattern is disposed is cut out of the conductive film to obtain a measurement sample. Current collector parts for sheet resistance measurements electrically connected to the fine metal wire pattern are formed at both ends of the obtained measurement sample. Electrical resistance R (Ω) between the current collector parts disposed at both ends is measured. Sheet resistance $R_s$ (Ω/sq) can be calculated according to the following expression from the obtained electrical resistance R (Ω), distance L (mm) between the current collector parts of the measurement sample, and length D (mm) in the depth direction.

$$R_s = R/L \times D$$

A lower sheet resistance tends to suppress power loss. Hence, an electronic paper, a touch panel, and a flat-panel display having less power consumption can be obtained.

The sheet resistance of the conductive film 100 tends to be reduced by improving the aspect ratio (height) of the fine metal wire. The sheet resistance may be adjusted by selecting the type of the metal material constituting the fine metal wire.

(Visible Light Transmittance)

The visible light transmittance of the conductive film 100 is preferably 80% or more and 100% or less, more preferably 90% or more and 100% or less. In this context, the visible light transmittance can be measured in accordance with JIS K 7361-1: 1997 for total light transmittance by calculating the transmittance in a range of the visible light (360 to 830 nm).

The visible light transmittance of the conductive film 100 tends to be improved by decreasing the line width of the fine metal wire pattern or by improving the opening ratio thereof.

(Haze)

The haze of the conductive film 100 is preferably 0.01% or more and 5.00% or less. The upper limit of the haze is more preferably 3.00% or less, further preferably 1.00% or less. When the upper limit of the haze is 5.00% or less, the cloudiness of the conductive film to visible light can be sufficiently reduced. The haze described herein can be measured in accordance with JIS K 7136: 2000 for haze.

[Roll]

The roll 200 of the present embodiment is a roll of the conductive film 100 and is in a form in which the conductive film 100 is rolled such that the conductive part 20 and the second side 10b are contacted with each other. FIG. 2 shows one form of the roll 200 of the present embodiment.

The conductive film 100 constituting the roll 200 is preferably a long film having short sides and long sides. In this case, the width of the roll 200 corresponds to the short sides of the conductive film 100. The roll 200 of such long conductive film 100 tends to be susceptible to set-off because the contact area between the conductive part 20 and the second side 10b is large and the conductive part 20 and the second side 10b are easily pressed due to tension at the time of rolling or the self-weight of the conductive film 100. Hence, the present invention is particularly useful.

The size of the conductive film 100 can be appropriately adjusted according to various purposes. As one example, the conductive film 100 constituting the roll 200 has preferably 10 mm or larger and 2000 mm or smaller, more preferably 50 mm or larger and 1500 mm or smaller, further preferably 100 mm or larger and 1000 mm or smaller short sides. The conductive film 100 constituting the roll 200 has preferably 1.0 m or larger and 2000 m or smaller, more preferably 5.0 m or larger and 1500 m or smaller, further preferably 10 m or larger and 1000 m or smaller long sides.

[Method for Producing Conductive Film]

Figure 6:
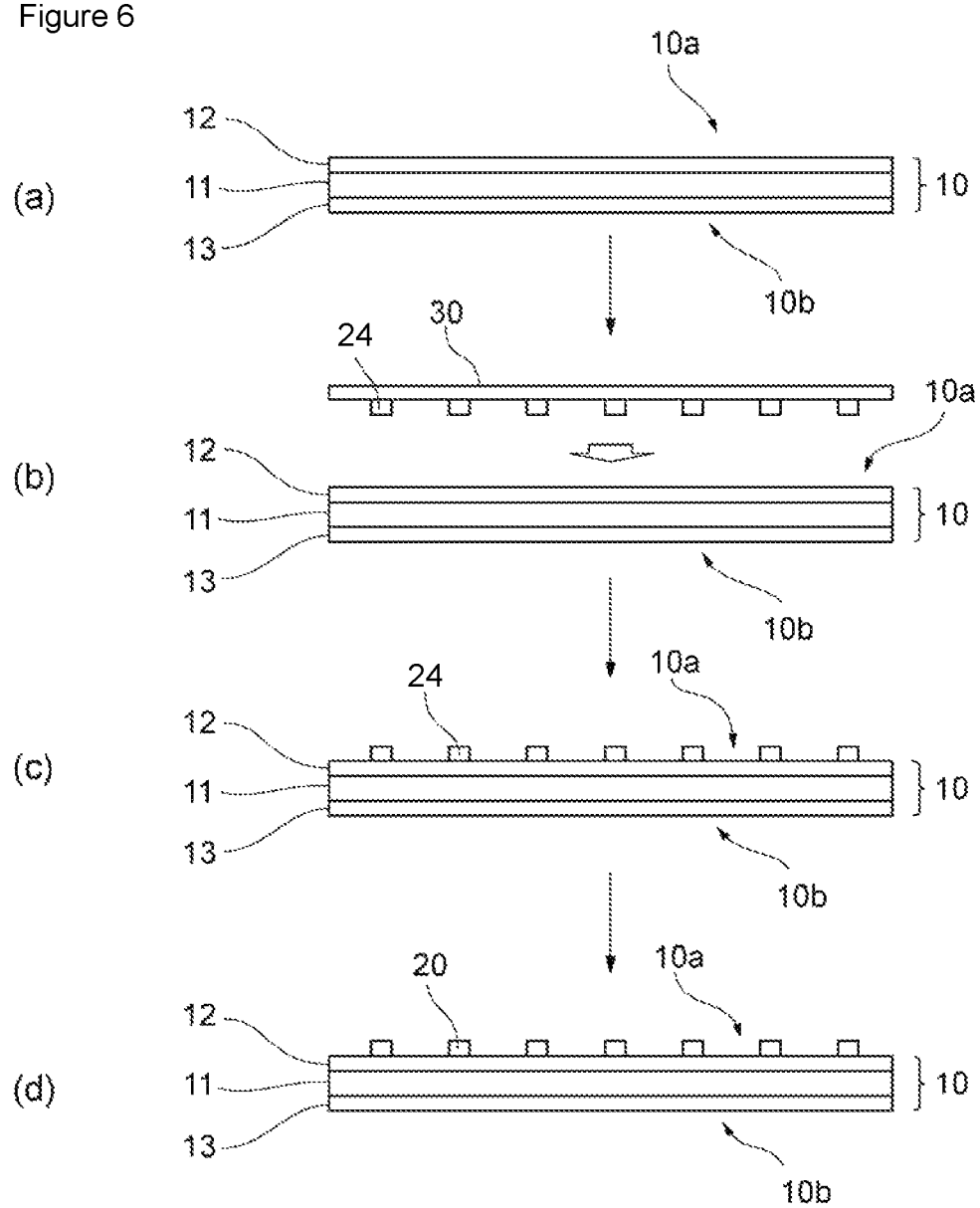
FIG. 6 shows a schematic view illustrating a method for producing the conductive film of the present embodiment.

Examples of the method for producing the conductive film include a method having a substrate preparation step of preparing substrate 10, wherein surface free energy $SFE_1$ on first side 10a of the substrate 10 is larger than surface free energy $SFE_2$ on second side 10b of the substrate 10 opposite to the first side 10a, a pattern formation step of forming a pattern on the first side 10a of the substrate 10 using ink containing a metal component, and a calcination step of calcining the ink to form conductive part 20. FIG. 6 shows one example of the method for producing the conductive film of the present embodiment.

[Substrate Preparation Step]

In the substrate preparation step, substrate 10 differing in surface free energy between the surface (first side 10a) and the back side (second side 10b) is prepared. More preferably, examples of such a method include a method of establishing outermost layer 12 and/or outermost layer 13 on one side or both sides of the core layer 11 (FIG. 6(a)), and a method of allowing the substrate 10 to differ in surface roughness between the front and back sides.

Examples of the method for forming the outermost layer 12 include, but are not particularly limited to, a method of forming a film from a component for the outermost layer 12 on the first side 10a of the core layer 11 by use of a vapor deposition method such as PVD or CVD. Another example of the method includes a method of forming the outermost layer 12 by applying a composition containing a component for the formation of the outermost layer 12 to the surface on the first side 10a of the core layer 11, followed by drying.

Examples of the method for forming the outermost layer 13 include, but are not particularly limited to, a method of forming the outermost layer 13 by applying a composition containing a component for the outermost layer 13 to the surface on the second side 10b of the core layer 11, followed by drying.

In the case of establishing an additional layer between the core layer 11 and the outermost layer 12 and/or the outermost layer 13, the outermost layer 12 and/or the outermost layer 13 can be formed after formation of the additional layer.

Examples of the method for increasing the surface roughness of the substrate 10 which is generally flat and smooth include, but are not particularly limited to, a method of establishing an easily adhesive layer having large surface roughness between the core layer 11 and the outermost layer 13, and forming the outermost layer 13 on the easily adhesive layer. The resulting outermost layer 13 reflects the surface roughness of the easily adhesive layer.

[Pattern Formation Step]

The pattern formation step is the step of forming a pattern using ink containing a metal component. The pattern formation step is not particularly limited as long as the step is performed by a plate printing method using a plate having grooves of the desired fine metal wire pattern. Such a method has, for example, the steps of: coating transfer medium surface with ink; allowing the transfer medium surface coated with ink to face the relief part surface of a relief printing plate, and pressing and contacting these surfaces to transfer the ink on the transfer medium surface onto the relief part surface of the relief printing plate; and allowing the surface of the transfer medium 30 having remaining ink 24 to face the first side 10a of the substrate 10, and pressing and contacting these surfaces to transfer the ink 24 remaining on the transfer medium surface to the first side 10a of the substrate 10 (FIGS. 6(b) to 6(c)). When the outermost layer 12 is formed on the substrate 10, the ink 24 is transferred to the surface of the outermost layer 12.

(Ink)

The ink for use in the pattern formation step contains a conductive component, and a solvent and may contain, if necessary, a surfactant, a dispersant, a reducing agent, or the like. When the conductive component is a metal component, the metal component may be contained as metal particles in the ink or may be contained as a metal complex in the ink.

The average primary particle size of metal particles is preferably 100 nm or smaller, more preferably 50 nm or smaller, further preferably 30 nm or smaller. The lower limit of the average primary particle size of the metal particles is not particularly limited and is, for example, 1 nm or larger. The average primary particle size of the metal particles is 100 nm or smaller, whereby the line width W of the resulting fine metal wire can be further thinned. The "average primary particle size" refers to the particle size of each individual metal particle (so-called primary particle) and is distinguished from an average secondary particle size which is the particle size of an aggregate (so-called secondary particle) formed by a plurality of metal particles together.

Examples of the metal particles include, but are not particularly limited to, metal oxides such as copper oxide, metal compounds, and core/shell particles having copper in the core part and copper oxide in the shell part. The form of the metal particles can be appropriately determined from the viewpoint of dispersibility and sinterability.

Examples of the surfactant include, but are not particularly limited to, fluorine surfactants. Use of such a surfactant improves the coatability of a transfer medium (blanket) with the ink and the smoothness of the ink used in coating and tends to produce a more uniform coating film. The surfactant is preferably configured so as to permit dispersion of the metal component and to be less likely to remain in calcination.

Examples of the dispersant include, but are not particularly limited to, a dispersant that noncovalently binds to or interacts with the metal component surface, and a dispersant that covalently binds to the metal component surface. Examples of the functional group for noncovalent binding or interaction include dispersants having a phosphoric acid group. Use of such a dispersant tends to further improve the dispersibility of the metal component.

Examples of the solvent include: alcohol solvents such as monoalcohols and polyalcohols; alkyl ether solvents; hydrocarbon solvents; ketone solvents; and ester solvents. These solvents may be used singly, or one or more thereof may be used in combination. For example, a monoalcohol having 10 or less carbon atoms and a polyalcohol having 10 or less carbon atoms are used in combination. Use of such a solvent tends to further improve the coatability of a transfer medium (blanket) with the ink, the transferability of the ink from a transfer medium to a relief printing plate, the transferability of the ink from the transfer medium to the transparent substrate, and the dispersibility of the metal component. The solvent is preferably configured so as to permit dispersion of the metal component and to be less likely to remain in calcination.

[Calcination Step]

In the calcination step, for example, the metal component in the ink 24 transferred to the first side 10a of the substrate 10 is sintered to form conductive part 20 (FIG. 6(d)). The calcination is not particularly limited as long as the method therefor can form a metal component sintered film by the fusion of the metal component. The calcination may be performed in, for example, a calcination furnace, or may be performed using plasma, a heating catalyst, ultraviolet ray, vacuum ultraviolet ray, electron beam, infrared lamp annealing, flash lamp annealing, laser, or the like. If the resulting sintered film is easily oxidized, the calcination is preferably performed in a non-oxidative atmosphere. If the metal oxide or the like is difficult to reduce with only the reducing agent that may be contained in the ink, the calcination is preferably performed in a reductive atmosphere.

The non-oxidative atmosphere is an atmosphere free from an oxidative gas such as oxygen and includes an inert atmosphere and a reductive atmosphere. The inert atmosphere is an atmosphere filled with an inert gas, for example, argon, helium, neon, or nitrogen. The reductive atmosphere refers to an atmosphere where a reductive gas such as hydrogen or carbon monoxide exists. A calcination furnace may be filled with such a gas, and the ink-coated film (dispersion-coated film) can be calcined in a closed system. Alternatively, the dispersion-coated film may be calcined in the circulated system of a calcination furnace where such a gas is allowed to flow. In the case of calcining the dispersion-coated film in a non-oxidative atmosphere, it is preferred that the calcination furnace should be temporarily vacuumized so that oxygen in the calcination furnace is removed and replaced with a non-oxidative gas. The calcination may be performed in a pressurized atmosphere or may be performed in a reduced pressure atmosphere.

The calcination temperature is not particularly limited and is preferably 20° C. or higher and 400° C. or lower, more preferably 50° C. or higher and 300° C. or lower, further preferably 80° C. or higher and 200° C. or lower. The calcination temperature of 400° C. or lower is preferred because a low heat-resistant substrate can be used. The calcination temperature of 20° C. or higher is preferred because the formation of a sintered film tends to proceed sufficiently, resulting in favorable conductivity. The resulting sintered film contains a conductive component derived from the metal component and may additionally contain the component used in the ink, or a non-conductive component according to the calcination temperature.

As described above, the present invention can provide a conductive film that is excellent in both conductivity and flexibility while maintaining its sufficient transparency, a conductive film roll, an electronic paper, a touch panel, and a flat-panel display.

EXAMPLES

Hereinafter, the present invention will be described more specifically with reference to Examples and Comparative Example. The present invention is not limited by the following Examples by any means.

Example 1

A polyethylene terephthalate (PET) film (manufactured by Toyobo Co., Ltd., product name: Cosmoshine A4100, film thickness: 50 μm) having an easily adhesive layer formed on one side was used as a core layer. A composition constituted by 2% by mass of silicon oxide nanoparticles, 1% by mass of a conductive organosilane compound, 65% by mass of 2-propanol, 25% by mass of 1-butanol, and 7% by mass of water was applied onto the side (first side 10a) where no easily adhesive layer was formed, and dried so that a silicon oxide-containing film having a thickness of 50 nm and a volume resistivity of 5000 Ωcm and containing silicon oxide was formed as outermost layer 12. A composition containing an alkyd compound (manufactured by Arakawa Chemical Industries, Ltd., product name: RL453) was applied onto the side (second side 10b) where the easily adhesive layer was formed, of the core layer, and dried so that outermost layer 13 having a thickness of 50 nm was formed to obtain substrate A.

Subsequently, 20 parts by mass of cuprous oxide nanoparticles having a particle size of 21 nm, 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of ethanol were mixed and dispersed to prepare ink having a cuprous oxide nanoparticle content ratio of 20% by mass.

Then, ink was applied to transfer medium surface. The transfer medium surface coated with ink was allowed to face a plate having grooves of a fine metal wire pattern, pressed and contacted to transfer a portion of the ink on the transfer medium surface to the relief part surface of the plate. Then, the transfer medium surface coated with the remaining ink was allowed to face the substrate A, pressed and contacted to transfer ink A1 having the desired fine metal wire pattern onto the substrate A. Subsequently, the ink having the fine metal wire pattern (dispersion-coated film) was calcined by flash lamp annealing in a room temperature environment using Pulseforge 1300 manufactured by NovaCentrix to obtain a conductive film having a fine metal wire in a mesh pattern having a line width of 3 μm and a thickness of 500 nm. The fine metal wire had $W_{0.50}/W_0$ larger than $W_{0.90}/W_{0.50}$.

Example 2

A conductive film was obtained in the same manner as in Example 1 except that a urethane compound (manufactured by Nacalai Tesque, Inc., product name: P05) was used instead of the alkyd compound (manufactured by Arakawa Chemical Industries, Ltd., product name: RL453) in the outermost layer 13.

Example 3

A conductive film was obtained in the same manner as in Example 1 except that a silicone compound (manufactured by Shin-Etsu Silicone, product name: KS-847) was used instead of the alkyd compound (manufactured by Arakawa Chemical Industries, Ltd., product name: RL453) in the outermost layer 13.

Example 4

A conductive film was obtained in the same manner as in Example 1 except that a fluorine compound (manufactured by Harves Co., Ltd., product name: DH-120TH) was used instead of the alkyd compound (manufactured by Arakawa Chemical Industries, Ltd., product name: RL453) in the outermost layer 13.

Example 5

A conductive film was obtained in the same manner as in Example 2 except that the line width and the thickness of the mesh pattern were set to 1 μm and 150 nm, respectively.

Example 6

A composition containing the same silicon oxide nanoparticles and conductive organosilane compound as in Example 1 was applied onto a side opposite to the release layer side (second side) of a release PET film (manufactured by Higashiyama Film Co., Ltd. (HYNT), product name: HY-NS70) so as to form a first side, and dried so that a silicon oxide-containing film having a thickness of 50 nm and a volume resistivity of 5000 Ωcm and containing silicon oxide was formed.

A film having the following configuration was obtained by the operation.

Outermost layer 12: silicon oxide-containing film
Core layer 11: polyethylene terephthalate (PET)
Outermost layer 13: release layer Subsequently, a fine metal wire in a mesh pattern having a line width of 3 μm and a thickness of 500 nm was formed on the outermost layer 12 (first side 10*a*) in the same manner as in Example 1 to obtain a conductive film having a mesh pattern.

Example 7

A conductive film was obtained in the same manner as in Example 6 except that a release PET film (manufactured by Higashiyama Film Co., Ltd. (HYNT), product name: HY-NS80) was used as the release PET film.

Example 8

A conductive film was obtained in the same manner as in Example 6 except that a release PET film (manufactured by Higashiyama Film Co., Ltd. (HYNT), product name: HY-NS85) was used as the release PET film.

Comparative Example 1

A conductive film was obtained in the same manner as in Example 1 except that the outermost layer 13 was not formed.

<Measurement of Surface Roughness (Arithmetic Average Roughness Ra)>

The method for measuring the surface roughness of each substrate will be described. The first side and the second side of each of the substrates prepared in Examples and Comparative Example were each used as a measurement sample to measure arithmetic average roughness. In the measurement, a surface roughness meter "Alpha-Step IQ" manufactured by KLA Corp. was used. The measurement conditions were as follows.

Step length: 500 μm
Style force: 10.6 mg

<Measurement of Transmittance>

The visible light transmittance of the conductive film was measured by calculating a transmittance to visible light having a wavelength of 360 to 830 nm in accordance with JIS K 7361-1: 1997 for total light transmittance.

<Measurement of Dispersive Term γSD and Polar Term γSP of Surface Free Energy>

The method for measuring the dispersive term γSD and the polar term γSP of surface free energy will be described. The first side and the second side of each of the substrates prepared in Examples and Comparative Example were each used as a measurement sample. 2 μL each of pure water and diiodomethane was added dropwise, as two solvents having known surface tension γL, dispersive term γLD of the surface tension, and polar term γLP of the surface tension, onto the measurement sample.

The drops of the two solvents added dropwise onto the measurement sample were observed and photographed edge-on under a digital microscope (VHX-100 manufactured by Keyence Corp.). Contact angles formed by the measurement sample and the drops were directly measured with measurement software attached to the digital microscope to obtain respective contact angles when the two solvents were used.

Two sets of simultaneous equation obtained by the substitution of the obtained contact angles θ, surface tensions $\gamma_{LV}$ of water and diiodomethane, dispersion terms $\gamma_{LV}^d$ of the surface tensions, and polar terms $\gamma_{LV}^p$ of the surface tensions into the following expression (4) were solved to determine dispersion term $\gamma_{SV}^d$ and polar term $\gamma_{SV}^p$ of surface free energy of the measurement sample.

$$\gamma_L(1+\cos\theta)/2 = (\gamma_{SV}^d \times \gamma_{LV}^d)^{0.5} \gamma_{SV}^p \times \gamma_{LV}^p)^{0.5} \quad (4)$$

[Set-Off Evaluation]

The conductive film (short sides: 230 mm, long sides: 150 m) obtained as described above was rolled around a shaft having a diameter of ϕ75 mm under a tension of 10 N placed in the longitudinal direction to obtain a roll having a length of 150 m. Then, the roll was stored at ordinary temperature for 24 hours and then rewound, and three samples were cut out at a position of 1 m from the end of the short side at the film starting point which corresponded to the center of the roll. The samples were cut out of positions on the long sides at both ends and the central side in the width direction, and the size of one sample was set to a size of 10 mm×10 mm. Then, the second side of each sample was confirmed in 9 fields of view under an optical microscope. The area of the conductive part having set-off to the second side was calculated per field of view to determine average value Ave. When the area of the conductive part supposed to be formed on the first side in the area (0.5 mm×0.5 mm) in the same field of view was defined as 100%, the ratio of the average value Ave thereto was then calculated and regarded as the rate of set-off.

The roll of the obtained conductive film was rewound before calcination by flash lamp annealing. A 1 m portion from a position of 1 m from the end of the same short side as above was wiped with Bemcot M-3II (manufactured by Asahi Kasei Corp.) impregnated with ethanol. Whether the ink adhered to the Bemcot was visually confirmed and regarded as pre-calcination ink adherence. The determination indicator was as follows.

◎: No ink adhered thereto.
○: Ink that adhered thereto was slightly confirmed.
X: Ink that adhered thereto was confirmed.

$SFE_2$ on the second side and obtained a favorable outcome in the set-off evaluation of the fine wire pattern. Particularly, Examples 2 to 7 having large difference between $SFE_1$ and $SFE_2$ had a favorable outcome in the pre-calcination ink adherence. On the other hand, Comparative Example 1 having surface free energy $SFE_1$ on the first side smaller than surface free energy $SFE_2$ on the second side failed to suppress the set-off of the fine wire pattern.

INDUSTRIAL APPLICABILITY

The conductive film of the present invention can be suitably used as a transparent electrode for an electronic paper, a touch panel, and a flat-panel display, etc. as well as a low-profile heater and the like and thus has industrial applicability.

REFERENCE SIGNS LIST

10 ... Substrate, 10a ... First side, 10b ... Second side, 11 ... Core layer, 12 ... Outermost layer, 13 ... Outermost layer, 20 ... Conductive part, 21 ... Fine metal wire, 22 ... Opening part, 23 ... Pattern unit, 24 ... Ink, 100 ... Conductive film, and 200 ... Roll.

The invention claimed is:

1. A conductive film comprising a substrate and a conductive part comprising at least a fine wire pattern formed on a first side of the substrate, wherein
   surface free energy $SFE_1$ on the first side is larger than surface free energy $SFE_2$ on a second side of the substrate opposite to the first side.

2. The conductive film according to claim 1, wherein a difference ($SFE_1 - SFE_2$) between the surface free energy $SFE_1$ and the surface free energy $SFE_2$ is 1 mJ/m² or more.

3. The conductive film according to claim 1, wherein the surface free energy $SFE_1$ is 40 to 50 mJ/m².

4. The conductive film according to claim 1, wherein the substrate has a layer comprising a silicon compound as an outermost layer on the first side.

TABLE 1

| | Line width [μm] | Pitch [μm] | Transmittance [%] | Surface free energy [mJ/m²] | | | Arithmetic average roughness Ra [nm] | | | Set-off evaluation | |
| --- | --- | --- | --- | --- | --- | --- | --- | --- | --- | --- | --- |
| | | | | First side $SFE_1$ | Second side $SFE_2$ | Difference ($SFE_2 - SFE_1$) | First side $Ra_1$ | Second side $Ra_2$ | Difference ($Ra_1 - Ra_2$) | Rate of set-off | Pre-calcination ink adherence |
| Example 1 | 3 | 60 | 83 | 42.7 | 41.7 | 1 | 0.9 | 0.9 | 0.0 | 0% | ○ |
| Example 2 | 3 | 60 | 83 | 42.7 | 21.7 | 21 | 0.9 | 0.9 | 0.0 | 0% | ◎ |
| Example 3 | 3 | 60 | 83 | 42.7 | 14.9 | 27.8 | 0.9 | 0.9 | 0.0 | 0% | ◎ |
| Example 4 | 3 | 60 | 83 | 42.7 | 11.1 | 31.6 | 0.9 | 0.9 | 0.0 | 0% | ◎ |
| Example 5 | 1 | 100 | 90 | 42.7 | 21.7 | 21 | 0.9 | 0.9 | 0.0 | 0% | ◎ |
| Example 6 | 3 | 60 | 83 | 47.3 | 22.5 | 24.8 | 2.7 | 1.4 | 1.3 | 0% | ◎ |
| Example 7 | 3 | 60 | 83 | 47.3 | 31.3 | 16 | 1.4 | 9.6 | -7.2 | 0% | ◎ |
| Example 8 | 3 | 60 | 83 | 47.3 | 32.8 | 14.5 | 1.8 | 6.5 | -4.7 | 0% | ○ |
| Comparative Example 1 | 3 | 60 | 83 | 42.7 | 43.9 | -1.2 | 0.9 | 0.9 | 0.0 | 100% | X |

Figure 7:
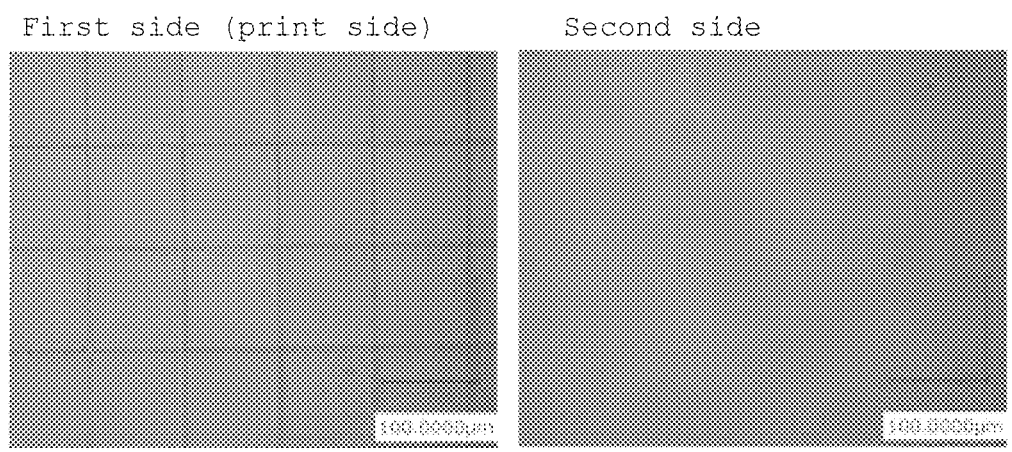
FIG. 7 shows photographs showing set-off results of a conductive film of Example.
Figure 8:
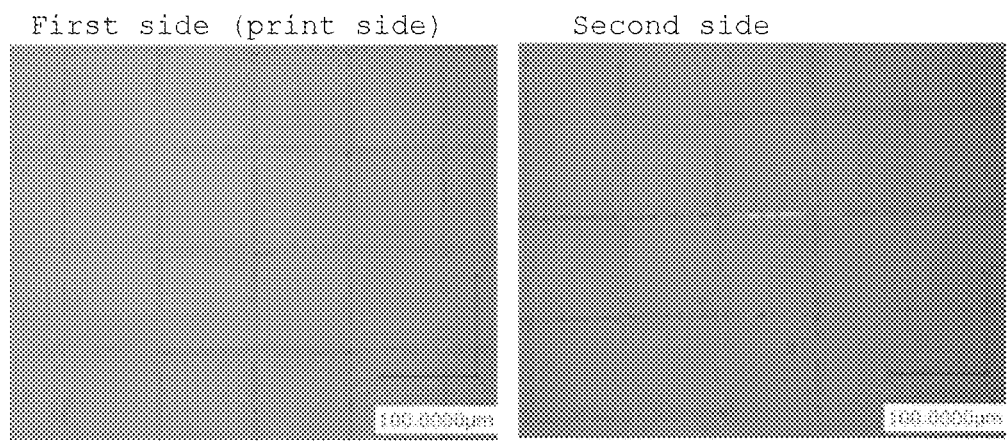
FIG. 8 is photographs showing set-off results of a conductive film of Comparative Example.

FIGS. 7 and 8 show photographs of the cut out samples in the set-off evaluation. FIG. 7 is photographs showing the first side and the second side of Example 1. FIG. 8 is photographs showing the first side and the second side of Comparative Example 1.

As shown in Table 1, Examples 1 to 7 had surface free energy $SFE_1$ on the first side larger than surface free energy 5. The conductive film according to claim 1, wherein the surface free energy $SFE_2$ is 11 to 42 mJ/m².

6. The conductive film according to claim 1, wherein the substrate has a layer comprising at least one member selected from the group consisting of a melamine compound, an alkyd compound, a fluorine compound, and a silicone compound as an outermost layer on the second side.

7. A roll of a conductive film according to claim 1, wherein
the conductive film is rolled such that the conductive part and the second side are contacted with each other.

8. The roll according to claim 7, wherein
the conductive film is a long film having 10 mm or larger and 2000 mm or smaller short sides and 1.0 m or larger and 2000 m or smaller long sides, and
the conductive film is rolled in the longitudinal direction.

9. The conductive film according to claim 1, wherein
a difference ($SFE_1-SFE_2$) between the surface free energy $SFE_1$ and the surface free energy $SFE_2$ is 16 mJ/m$^2$ or more.

10. The conductive film according to claim 1, wherein
a line width $W_0$ of a fine metal wire is 0.1 to 30.0 μm.

* * * * *